(12) United States Patent
Vaughn

(10) Patent No.: X9643
(45) Date of Patent: May 6, 1836

(54) BALANCE

(76) Inventor: Jirah Vaughn

Jirah Vaughn
Letters Patent

The Schedule referred to in these Letters Patent and making part of the same
containing a description in the words of the said Jirah Vaughn himself of
his Improvement in the Steelyard or Roman Balance To all to whom these presents shall come. Be it known that I Jirah
Vaughn of Rutland in the County of Rutland and State of Vermont have
invented a new and useful improvement in the steelyard or Roman Bal-
ance, and that the following is a full and exact description thereof,
A Metallic bar 13 inches in length (including the hook on the long end 1½ inch-
es long setting in a stirrup) and 3/8ths of an inch thick is prepared of the
following widths that is to say the short arm of the bar is made 4⅝ inches
long and 3 inches wide being swelled at and above the fulcrum to 3 ¾ inches.
The fulcrum being inserted and made fast at the distance of 3⅝ inches from
the end of the short arm before the cap is put on, then commencing at the
distance of 5 sixteenths of an inch from the point of the fulcrum, a slit
3/4ths of an inch wide is cut through the short arm to receive the sliding
pivot, hereafter described. The sides of this slit are so filed as to receive be-
tween them a dove tail'd bed of hardened steel made exactly to fit in
the slit and into which bed the sliding pivot is fastened. On this pivot
the loop is hung to which the scale or platform is suspended contain-
ing the weight. A cap 3/4ths of an inch wide is then let on with a dove tail to
the open ends of the short arm and is made fast, with a single screw run-
ning through into each side, which constitutes the head of the Bar. In the
line of the Bar and through the cap a mortise is made ½ an inch long and
3/16th of an inch wide, through which a thin bar or rod of the same width and
thickness and about 7 inches long (with a small knob on the outer end which
serves as a handle) is passed up to and made fast in, or rather [illegible] [illegible]
in the bed of the sliding pivot by a pin on which it has a slight rolling motion.
Through the cap on the lower side of the mortise, at right angles with it, a small
bit of steel, 3/8th of an inch square is inserted and made fast upon the [illegible]

[illegible] the thin bar, or spring which is attached as just mentioned to the bar
of the sliding pivot, and on the lower edge or side of which bar are notches
as required made exactly to fit on the rest and so as to maintain the sliding
at the several points or positions herein after specified. On the upper side of the
[illegible] a spring is inserted and made fast with a small screw, the
point of which spring acts upon and keeps down the small bar upon the
rest. When the sliding pivot, by means of this small bar is drawn out so
that its points and those of the fulcrum are 3 1/4 [illegible] apart the Bar
or Balance is then adjusted to its lowest power. Again let the points of
the pivot and fulcrum approach to the distance of 1 7/16 [illegible] when
the small bar will be with one of its notches on the rest. The Balance is
now prepared to exert its second power. And lastly let the points be moved
up to their proximate position 1/4 of an inch, the balance is then prepar-
ed to exert its highest power, as will be more fully explained hereafter in
describing the graduated plane scale. The long arm of the bar or balance
is made 1/4 inches in width throughout; excepting a knob on the upper and
under sides at the extreme end [illegible] inch square each, to which the [illegible] is
screwed by its two ends. the lower knob being produced in the line of the bar
and slightly bended at its extreme point: serving to hold in place that
end of the bar in a stirrup let down from a frame above, A slit 11/4 by 3/16ths
of an inch is then cut through the long arm to a point within 3/4 or 5/8 of
an inch of the [illegible] On this slit a groove is sunk 1/8 inch wide and 1/16ths
of an inch deep from a point 1/2 an inch from the fulcrum and through-
out the length of the arm. Into this groove and exactly fitting, it is placed
the graduated scale which is made to slide back and forth therein and is
maintained in the groove by the following means, viz; a screw is passed
through at right angles, near the end of the scale near the fulcrum of
sufficient length on one side to hold a portion of the [illegible], and on the other
side to pass through the slit in the long arm into a nut on the reverse side,
which maintains that end of the scale in the groove; on the end of the long
arm, on the knobs above mentioned, a thin and narrow strip of steel
passing across that end of the scale is made fast to the knobs and is de-
nominated the [illegible], which maintains the other end of the scale in the groove
and, and the pivot its being drawn quite out from the bar, The scale is to be
graduated as hereafter directed being made to fill the above mentioned
groove is 12 3/4 the inches in length and weighs 11 1/2 ounces avoirdupois; on the
end near the fulcrum a portion of the poise somewhat the heaviest is attach-
ed by the screw holding the nut on the reverse side of the Bar. this portion
of the poise weighs 16 3/4 ounces avoirdupois. On the other end of the scale
there is fixed one end of an endless screw 3 or 4 inches in length upon which
is placed another portion of the poise less than the former and weighing
9 3/4ths ounces avoirdupois. This portion is denominated the balance
poise and serves the additional office of putting the bar a balance in e-
quilibrio. The scale is then divided into three longitudinal divisions
or compartments upon which are marked the three several powers of the
balance. Being placed in the groove on the bar and close up to the fulcrum
as near as may be the scale is then ready for graduation; which is accom-
plished after this manner. Suspend the bar horizontally by the loop on the
fulcrum, letting the hook on the end rest in the scruple let down from
the frame. Draw out the sliding pivot so that its points and those of the
fulcrum shall be 3 1/8 inches apart, turn the balance poise on or off the
endless screw as the case may require so that the line of the bar be in e-
quilibrio; then draw a line across the scale close to the right hand side of
the ivory when this first line will represent 0 on the upper horizontal di-
vision or the bar in balance. When the bar is in balance at this point it
will be accurate in weighing on its two higher powers. Next suspend
a 1 pound weight on the shoe or platform suspended from the loop on the
sliding pivot: draw out the scale from left to right until the bar is again
in balance: mark across the scale as before and this second transverse line
will mark the weight of 1 pound in the upper longitudinal division on
the scale. Suspend, as before another 1 pound weight on the shoe. draw out
the scale again to a balance. mark another line across. and the mark
or graduation for 2 pounds is ascertained. Proceed in like manner until
the graduations are completed to the left hand end of the scale. Again
move up the sliding pivot to a point 1 7/8 the inches from the points of the
fulcrum when the small bar will catch by its notch on the rest; place
the the scale at O. marked on the upper division, the second or middle divis-
ion will show immediately under O, 135 pounds. The graduation in
the division will coincide with those in the upper, and increase by 3 pounds
at every successive transverse line to the ultimate power of the division. Lastly
by pushing the sliding point towards the fulcrum to its nearest position which
is 9/16ths of an inch between the points: place the scale again at the mark O.
on the upper division, the index will show directly under on the lower
division 360 pounds. The graduations in this lower division also coin-
cide with those in the two upper ones, and increase by five pounds at every
successive transverse line to the ultimate power of the division which is 910
pounds. After the same manner are ounces and all other denominations of weight
known or used in commercial or other business transactions, graduated on this
scale. It is obvious that by reducing the weight of the poise proportion-
ally, ounces and smaller divisions of the pound may be graduated, but
in that case the capacity of the balance will be relatively diminished
In like manner by increasing the poise an increased capacity is given
to the balance to any extent. Or the long arm of the bar and the scale
may be extended, and ounces and smaller divisions graduated without
reducing the poise. I contemplate applying this improved balance
to the weighing all ponderable bodies both great and small and in con-
structing the machine having regard always to the use to which the
instrument will be applied and therefore giving it size and propor-
tion according to those uses, in order to ensure its strength. It may be
used with the common scale or [illegible] the platform or in any other way
~~way~~ and manner now used with other balances for holding the weight
always observing that when and however it be used the bar should be first
placed in equilibrio at the point O. on the upper division, in order to
ascertain that no matter has accumulated on the platform, to disturb
the balance or get it out of tune. What I claim as my own invention
and not previously known in the above described machine is first
the combination and application of the graduated plane scale with
the poise and index as above described, to the long arm of the steelyard
and applied to the purposes of weighing [illegible] &c. 2nd The sliding point in
the the short arm of the steelyard as above described, and applied either
with or without the said combined graduated plane scale as aforesaid
to the weighing of all ponderable substances as aforesaid. In testimony that
the above is a true specification of my said invention and improvement
I have hereunto subscribed my name this 4th day of April in the year
of our Lord one thousand eight hundred and thirty six.

Witnesses
Jesse Grove
Henry W. Porter

Isaiah Vaughan

[illegible]
Cl. [illegible]

2040 [illegible]